United States Patent
Norgard

(10) Patent No.: US 9,809,051 B2
(45) Date of Patent: Nov. 7, 2017

(54) TRANSPARENT TEMPLATE AND POSITIONING DEVICE WITH OVERLAPPING LINES FORMING A HALO EFFECT

(71) Applicant: Rulersmith IP, Inc., Shoreline, WA (US)

(72) Inventor: Elmer J. Norgard, Bellingham, WA (US)

(73) Assignee: Rulersmith IP, Inc., Shoreline, WA (US)

( * ) Notice: Subject to any disclaimer, the term of this patent is extended or adjusted under 35 U.S.C. 154(b) by 112 days.

(21) Appl. No.: 15/043,139

(22) Filed: Feb. 12, 2016

(65) Prior Publication Data

US 2016/0238363 A1 Aug. 18, 2016

Related U.S. Application Data

(60) Provisional application No. 62/117,337, filed on Feb. 17, 2015.

(51) Int. Cl.
| | |
|---|---|
| *G01B 3/14* | (2006.01) |
| *B43L 13/20* | (2006.01) |
| *G01B 3/00* | (2006.01) |
| *B25H 7/02* | (2006.01) |

(52) U.S. Cl.
CPC ............ *B43L 13/201* (2013.01); *B25H 7/02* (2013.01); *G01B 3/006* (2013.01)

(58) Field of Classification Search
CPC .............................. G01B 3/004; B43L 13/205
USPC ................................ 33/562, 566, 494, 679.1
See application file for complete search history.

(56) References Cited

U.S. PATENT DOCUMENTS

| | | | |
|---|---|---|---|
| 3,634,951 A | 1/1972 | Knoll | |
| 5,575,074 A | 11/1996 | Cottongim et al. | |
| 5,819,422 A * | 10/1998 | Schafer | D05B 97/12 33/1 B |
| 6,467,179 B1 * | 10/2002 | Wolf | B43L 7/027 33/465 |
| 6,839,971 B2 * | 1/2005 | Schafer | B26B 29/06 33/1 B |
| 8,156,877 B1 * | 4/2012 | Carr | D05B 11/00 112/117 |
| 8,375,613 B2 | 2/2013 | Spiro | |
| 8,904,661 B1 | 12/2014 | Norgard et al. | |
| 2005/0178013 A1 * | 8/2005 | Schafer | B26B 29/06 33/1 B |

(Continued)

FOREIGN PATENT DOCUMENTS

CN 203110700 U 8/2013

*Primary Examiner* — G. Bradley Bennett
(74) *Attorney, Agent, or Firm* — Seed IP Law Group LLP

(57) ABSTRACT

An improved transparent template and positioning device for aligning material to be stitched, marked or cut, the template including two overlapping lines with one or more being translucent and one or more using fluorescent pigment that will overlap their colors to create a third color forming an outline or "halo" effect of enhanced visibility, enabling the darker more precise opaque lines on the ruler to be easily seen or found on light and dark materials. The translucent lines will allow the user to see through the template to the actual material that he or she is working with in order to provide improved viewing and more accurate alignment.

22 Claims, 2 Drawing Sheets

(56) References Cited

U.S. PATENT DOCUMENTS

| | | | |
|---|---|---|---|
| 2006/0042111 A1* | 3/2006 | Hoopengarner | G01B 3/1082 33/760 |
| 2008/0120859 A1 | 5/2008 | Eversdijk | |
| 2009/0025245 A1* | 1/2009 | Brady | G01B 3/004 33/562 |
| 2015/0240400 A1* | 8/2015 | Baker | D05B 97/12 33/566 |
| 2015/0267334 A1* | 9/2015 | Works | D05B 97/12 33/566 |

* cited by examiner

TRANSPARENT TEMPLATE AND POSITIONING DEVICE WITH OVERLAPPING LINES FORMING A HALO EFFECT

BACKGROUND

Technical Field

The present disclosure is directed to positioning devices to be used in aligning material to be stitched, marked or cut and, more particularly, to a transparent template that includes two overlapping lines with one or more being translucent and one or more using fluorescent pigment that when overlapped with the translucent lines will combine to create a third color forming an outline or "halo" effect, of enhanced visibility.

Description of the Related Art

Transparent rulers and templates having grid lines formed thereon are known for use in aligning, measuring, and marking material, such as fabric, paper, plastic, and the like. These rulers and templates are also used to guide a tool, such as a razor, knife, or rotary cutter, in cutting the material to desired sizes and shapes or to guide a tool such as a long arm quilting machine to stitch materials.

Most templates and positioning devices use etching or single color opaque markings, such as lines, to aid in aligning underlying material to be stitched, marked or cut. If the lines are etched, they will only be visible to the naked eye when positioned over dark materials, making the positioning of the template less versatile. If the markings are a single color, they will only be visually useful when the template is placed on working material that is of contrasting light or dark colors. This does not allow the user to visually align the material accurately with the markings, resulting in misalignment and unsatisfactory work product. Two contrasting superimposed lines have also been used to form a composite two-color line. This helps in most cases, depending on the colors used on the template and the color of the fabric. In some cases the composite lines can still be difficult to see, such as in low-light conditions.

Previous attempts to solve this problem include:
Superimposing contrasting opaque lines of different widths.
Using a wide transparent line superimposed over an opaque line.
Adding fluorescent pigment to the ink to enhance a wide transparent line.
Creating a window opening in the opaque line to allow the user to see the material.

BRIEF SUMMARY

The present disclosure is directed to an improved transparent template and positioning device for aligning of material to be stitched, marked or cut. The template includes two overlapping lines with one or more being translucent and one or more using fluorescent pigment. Where the lines overlap, the colors will combine to create a third color forming an outline or "halo" effect enabling the darker, more precise opaque lines on the ruler to be easily seen or found on light and dark materials. The translucent lines will allow the user to see through to the actual material that he or she is working with in order to provide for improved viewing and alignment.

In accordance with one aspect of the present disclosure a device is provided that includes a substrate having first and second opposing sides and formed of a material that enables viewing through the substrate, a composite line on one of the first and second opposing sides, the composite line including: an opaque line, a first translucent line of a first color and at least partially surrounding without overlapping or touching the opaque line, and forming a space between the opaque line and the first translucent line, and a second translucent line of a frosted white color that at least partially overlaps the first translucent line to create a visually perceptible third translucent line that has enhanced visibility.

In accordance with a further aspect of the present disclosure, a tool is provided that includes a substrate formed of a transparent material and including opposing first and second sides, a first translucent line on the first or second side of the substrate and having a fluorescent effect or color, and a second translucent line on the first or second side of the substrate and overlapping a portion of the first translucent line, the second translucent line having a white color that combines with the overlapped portion of the fluorescent color of the first translucent line to form a visually perceptible third translucent line that has enhanced visibility.

In accordance with another aspect of the present disclosure, a device is provided that includes a substrate having first and second opposing sides and formed of a material that enables viewing through the substrate, a composite line on one of the first and second opposing sides, the composite line including: an opaque line, a first translucent line of a first color at least partially surrounding without touching the opaque line to leave a space around the opaque line, and a second translucent line of a white color at least partially overlapping the first translucent line that combines with the at least partially overlapped first translucent line to create a visually perceptible third translucent line that has enhanced visibility, particularly with respect to the opaque line, first translucent line and second translucent line.

In accordance with another aspect of the present disclosure a tool is provided that includes a substrate formed of a transparent or translucent material and including opposing first and second sides, a first translucent line on the first or second side of the substrate and having a fluorescent color, and a second translucent line on the first or second side of the substrate and overlapping a portion of the first translucent line, the second translucent line having a white color that combines with the fluorescent color of the first translucent line to form a visually perceptible third translucent line that has enhanced visibility in combination with the opaque line, first translucent line and second translucent line.

In accordance with another aspect of the foregoing implementation, the tool includes an opaque line on the first or second side of the substrate that is at least partially overlapped by the first translucent line.

As will be readily appreciated from the foregoing, the present disclosure avoids the disadvantages of prior methods and achieves a ruler that enhances the ability to view the markings against underlying material. The halo effect of the overlapping lines allow the user to see through the template to the actual material that he or she is working with in order to provide improved alignment and increased measurement and cutting accuracy.

BRIEF DESCRIPTION OF THE SEVERAL VIEWS OF THE DRAWINGS

The foregoing features and advantages of the disclosed implementations will be more readily appreciated as the same become better understood from the following detailed description when taken in conjunction with the accompanying drawings wherein:

FIG. 1 is an enlarged plan view of a portion of a tool for measuring material utilizing unique halo effect markings in accordance with the present disclosure.

DETAILED DESCRIPTION

Figure 2C:
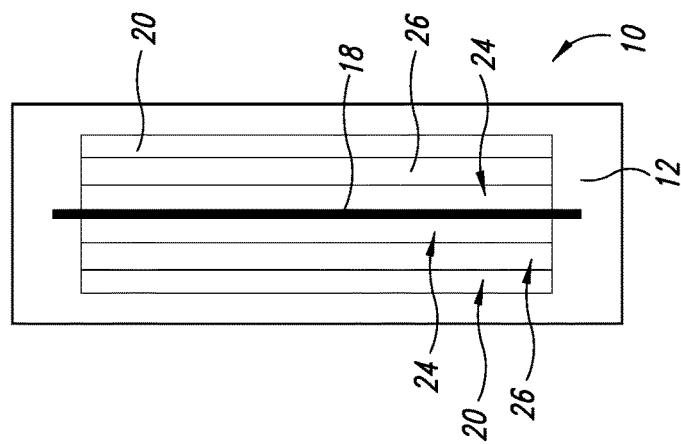
FIGS. 2A-2C are enlarged plan views of a portion of a transparent measuring device showing the steps of forming a halo effect line in accordance with the present disclosure.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures or components or both associated with transparent measuring devices, rulers, templates, cutting guides and the inks used thereon as well as manufacturing processes for the same have not been shown or described in order to avoid unnecessarily obscuring descriptions of the representative implementations.

Unless the context requires otherwise, throughout the specification and claims that follow, the word "comprise" and variations thereof, such as "comprises" and "comprising" are to be construed in an open inclusive sense, that is, as "including, but not limited to." The foregoing applies equally to the words "including" and "having."

Reference throughout this description to "one implementation" or "an implementation" means that a particular feature, structure, or characteristic described in connection with the implementation is included in at least one implementation. Thus, the appearance of the phrases "in one implementation" or "in an implementation" in various places throughout the specification are not necessarily all referring to the same implementation. Furthermore, the particular features, structures, or characteristics may be combined in any suitable manner in one or more implementations.

It is to be understood that "device" and "tool" are intended to embrace rulers, templates, and devices for manually aligning, marking, measuring, stitching, or cutting underlying material, such as cloth fabric, or for performing combinations of the foregoing operations.

In one implementation a device is provided that includes a substrate having first and second opposing sides and is formed of a material that enables viewing through the substrate. A composite line is formed on one of the first and second opposing sides. The composite line includes an opaque line, a first translucent line of a first color and at least partially surrounding without overlapping or touching the opaque line, and forming a space between the opaque line and the first translucent line, and a second translucent line of a frosted white color at least partially overlapping the first translucent line and to create a visually perceptible third translucent line that has enhanced visibility.

In another implementation, a tool is provided that includes a substrate formed of a transparent material with opposing first and second sides. A first translucent line is formed on the first or second side of the substrate and has a fluorescent color, and a second translucent line is formed on the first or second side of the substrate and overlaps a portion of the first translucent line, the second translucent line having a white color that combines with the overlapped portion of the fluorescent color of the first translucent line to form a visually perceptible third translucent line that has enhanced visibility.

Figure 1:
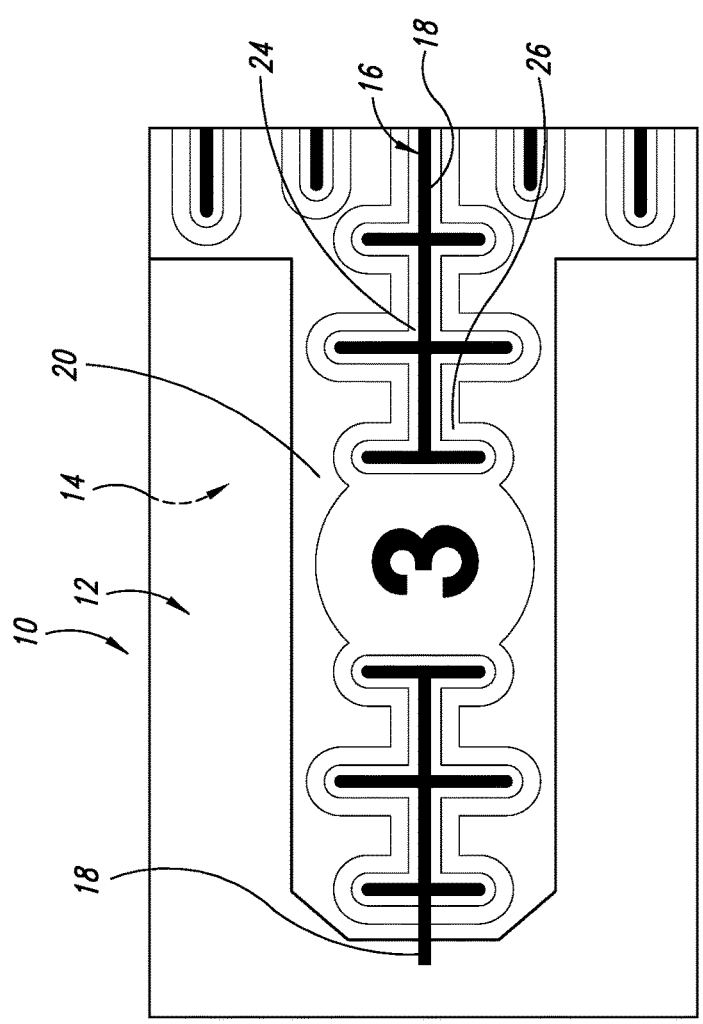

Referring initially to FIG. 1, illustrated therein is a portion of a transparent measuring device 10 having a transparent substrate with opposing first and second sides 12, 14, each side having respective surfaces that are substantially planar. On one or the other of the sides 12, 14, or on both of the sides 12, 14, a plurality of lines 16 are formed on the respective surface. Preferably the lines are formed on a single surface of each side 12, 14 by screen printing as is known in the art.

Ideally the device 10 is constructed of clear acrylic, ⅛" to ¼" thick for durability and rigidity. The acrylic is laser cut to size for accuracy, and the edges are polished. The acrylic surface on one side 12 or 14 is preferably screen printed with the desired markings, which can include without limitation lines, circles, indicia such as letters and numbers, as well as curved lines, composite lines, and it can include inscribed lines. It is to be understood that other methods of applying or forming markings on the surfaces 12, 14 of the device can be used as known in the art. The markings may also be directly printed on the acrylic using a large format digital printer.

The preferred method is the screen printing process because it permits the application of a heavy deposit of ink. Alternatively, present methods do permit the direct transfer of an electronic or computer image to a print screen, bypassing the step of using an ortho film, although this is much more expensive. In addition, a lithograph press, an engraving process, thermal (hot) stamping of foil, or a photographic process may also be used, as well as any combination of graphics and manufacturing. Finally, high-speed laser printers that print a computerized image directly to a plastic sheet are also available. Virtually any pigment transfer method may be used to generate the markings of the present disclosure on the transparent sheet. Another method takes advantage of precision cutting equipment to cut out pre-printed adhesive plastic that can be applied as a layered substrate to the transparent sheet, particularly for non-transparent and non-translucent lines and markings.

Figure 2B:
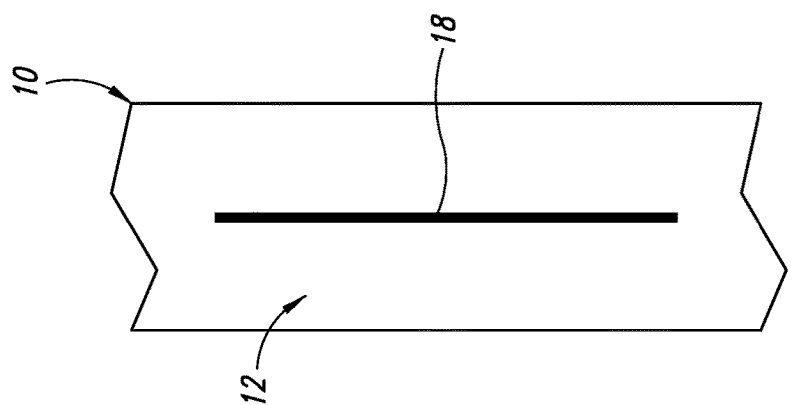
Figure 2A:
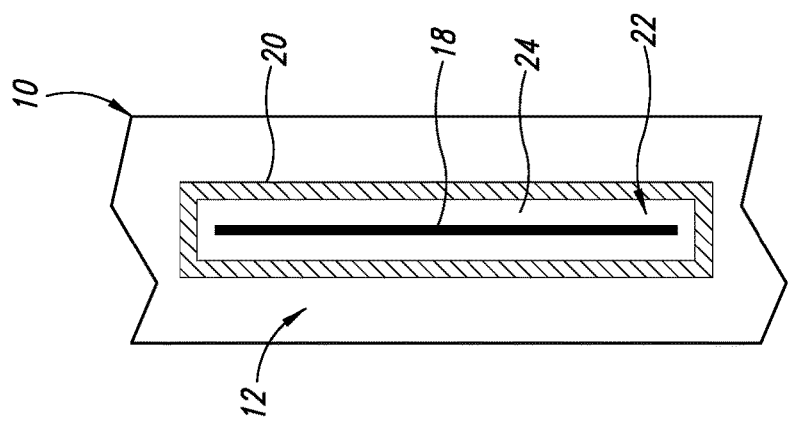

With respect to forming halo effect markings in accordance with this disclosure, the following description will be with respect to forming a linear line as shown in FIGS. 2A-2C. It is to be understood that the following method and process can be used for almost any indicia or marking, including without limitation linear or curved, where the halo effect is desired.

Initially, a dark opaque line 18 is formed on either surface of the first or second side 12, 14 of the device 10 using one of the methods described above, although screen printing with ink is preferred. Because the screen printing method of applying the lines to the substrate or transparent sheet is well known, it will not be described in further detail. In another implementation the opaque line 18 is optional or is only used with some but not all of the lines on the device 10.

Next, a first translucent line 20 is formed on the same surface of the first or second side 12, 14. Preferably the first translucent line 20 is formed of a fluorescent pigment material or fluorescent effect color or paint. The word "translucent" is intended to mean semitransparent so that it permits light to pass through without a user being able to see clearly through the line. This line 20 ideally has fluorescent pigment in the material that enhances the visual effect and visibility of the line 20 formed therefrom.

The line 20 is preferably sized and shaped to surround but not touch the first opaque line 18, leaving a space 22 between the two lines 18, 20. In other words, the first translucent line 20 is located around the outside of the opaque line 18 to encircle or surround the opaque line without touching the opaque line 18. Alternatively, the first translucent line 20 can be applied over the opaque line 18 and to extend beyond the opaque line, preferably to assume a shape similar to the opaque line 18. The space 22 is thus the portion of the first translucent line 20 that does not overlap the opaque line.

In the preferred construction, the space 22 between the opaque line 18 and the fluorescent color line 20 is where a third color line 24 is formed. The third color line 24 is now preferably formed behind the opaque line 18 and sized and shaped to fill the space 22 between the opaque line 18 and the fluorescent color line 20. While it is not necessary that this third color line 24 be formed behind or on top of the opaque line 18 or that it completely fill the space 22, it is preferred that it do so to ensure the "halo" effect is achieved. This third line 24 will be approximately three times the width of the opaque line 18 and, in most applications, will partially overlap the fluorescent color line 22. Ideally, it overlaps the fluorescent color line 20 by about 0.015 inches so that it has enhanced visibility in combination with the fluorescent color line 20 and with the opaque line 18 when it is formed behind or on top of the opaque line 18. The range of overlap of the fluorescent line 20 and the third line 24 can be from 0.005 to 0.030 inches and more preferably in the range of 0.010 to 0.020 inches.

The color of the third line 24 will ideally be a translucent frosted white color and formed of a material or paint that is readily commercially available. The translucent frosted white line 24 overlaps behind, meaning on top of, the translucent fluorescent color line 22 in a manner that will brighten the overlapped portion 26 of the fluorescent color line 22, and thus forming an outline or "halo" effect line 26 around the dark opaque line 18. Ideally the shape of the third line 24 follows the shape of the opaque line 18.

The first line, i.e., the opaque line 18, is preferably formed of black solvent ink, although other materials may be used, including without limitation UV ink and digital printing. The second line, the fluorescent line 20, is preferably translucent and is formed of yellow material or ink. The third line 24 is the one that combines with the fluorescent line 20 to create the halo effect line 26 in the area where it overlaps the second fluorescent line 20, and it is preferably formed of translucent frosted white ink or material. Ideally all of the lines are formed on a back surface of the device, in this case the surface of second side 14, so that it bears against the material being viewed through the transparent substrate or device, thus reducing the chance for parallax error.

The various implementations described above can be combined to provide further implementations. In the alternative implementation where the fluorescent line 20 overlaps and extends beyond the opaque line 18, the space 22 is at least partially overlapped with the third line 24 of the frosted white color to create the "halo effect" line 26. Preferably the third line 24 has a similar shape to that of the opaque line 18. Alternatively, the first translucent line 20 and the translucent third line 24 can be combined without using the opaque line 18 to form an enhanced translucent line.

Aspects of the implementations can be modified, if necessary to employ concepts of the various patents, applications and publications to provide yet further implementations. For example, thinner, less rigid acrylic or other materials could be used with less desirable results. Different methods for cutting the material could be used which would produce less desirable results. The tool could also be produced without the opaque line and using only the two translucent lines to create the "halo" or outline effect. Other colors could also be used with similar results although the use of the frosted white color for the third line 24 has been found to yield the most visible "halo effect" line to date.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A device, comprising:
   a substrate having first and second opposing sides and formed of a material that enables viewing through the substrate;
   a composite line on one of the first and second opposing sides, the composite line including:
      an opaque line;
      a first translucent line of a first color and at least partially surrounding without overlapping or touching the opaque line, and forming a space between the opaque line and the first translucent line; and
      a second translucent line that at least partially overlaps the first translucent line and the space to create a visually perceptible third translucent line that enhances the visibility of the opaque line.

2. The device of claim 1, wherein the second translucent line overlaps the opaque line and fills the space to enhance visibility of the opaque line.

3. The device of claim 2 wherein the first translucent line has a yellow color.

4. The device of claim 1 wherein the first translucent line comprises a line formed of fluorescent pigment material.

5. A tool, comprising:
   a substrate formed of a transparent material and including opposing first and second sides;
   a first translucent line on a first or second side of the substrate and having a fluorescent effect;
   a second translucent line on the first or second side of the substrate and overlapping a portion of the first translucent line, the second translucent line having a white color that combines with the overlapped portion of the first translucent line to form a visually perceptible third translucent line that has enhanced visibility to enhance the visibility of the opaque line.

6. The tool of claim 5 wherein the second translucent line has a frosted white color.

7. The tool of claim 5, further comprising an opaque line on the first or second side of the substrate and at least partially surrounded by the first translucent line to form a clear space between the opaque line and the first translucent line.

8. The tool of claim 7 wherein the opaque line is surrounded by the first translucent line to form a clear space around the opaque line that is between the opaque line and the first translucent line and further wherein the second translucent line is located within the space and at least partially overlaps the first translucent line to form the third translucent line to be brighter than the first translucent line and forming a halo effect around the opaque line to enhance the visibility of the opaque line.

9. The tool of claim 7 wherein the second translucent line overlaps the opaque line, fills the space surrounding the opaque line, and at least partially overlaps the second translucent line to form the third translucent line at the location where the second translucent line overlaps the first translucent line, the third translucent line having enhanced visibility over the first and second translucent lines.

10. A transparent template and positioning device for use in aligning material to be stitched, marked or cut, the template comprising:
   a substrate having mutually opposing first and second sides and formed of a material that allows viewing through the substrate;
   an opaque marking on the first side of the substrate;
   a first translucent marking on the first side of the substrate that is in spaced relationship to the opaque marking to form a space between the opaque marking and the first translucent marking; and
   a second translucent marking on the first side of the substrate that is at least partially overlapping the first translucent marking to form a third translucent line at the location where the second translucent marking at least partially overlaps the first translucent marking, the third translucent marking being brighter than the first and second translucent markings and forming a halo effect around the opaque marking to enhance the visibility of the opaque marking.

11. The template of claim 10 wherein the second translucent marking at least partially overlaps the opaque marking and fills the space between the opaque marking and the first translucent marking.

12. The template of claim 11 wherein the opaque marking has a width and the second translucent marking has a width at least three times the width of the opaque marking.

13. The template of claim 10 wherein the opaque marking has a shape and the second translucent marking follows the shape of the opaque marking so that the third translucent marking also follows the shape of the opaque marking.

14. The template of claim 10 wherein the first translucent marking has a yellow color and the second translucent marking has a frosted white color.

15. A device, comprising:
   a substrate having first and second opposing sides and formed of a material that enables viewing through the substrate;
   a composite line on one of the first and second opposing sides, the composite line including:
      a first translucent line of a first color; and
      a second translucent line that at least partially overlaps the first translucent line to create a visually perceptible third translucent line that enhances the visibility of the composite line.

16. The device of claim 15, wherein the second translucent line is of a second color that is different than the first color and the third translucent line is of a color that is darker in color than the first and second colors.

17. The device of claim 15 wherein the first translucent line comprises a line formed of fluorescent pigment material.

18. The device of claim 15 wherein the first translucent line has a yellow color and the second translucent line has a frosted white color.

19. A transparent template and positioning device for use in aligning material to be stitched, marked or cut, the template comprising:
   a substrate having mutually opposing first and second sides and formed of a material that allows viewing through the substrate;
   a first translucent marking on the first side of the substrate; and
   a second translucent marking on the first side of the substrate that is at least partially overlapping the first translucent marking to form a third translucent line at the location where the second translucent marking at least partially overlaps the first translucent marking, the third translucent marking being brighter than the first and second translucent markings to enhance the visibility of the first, second, and third translucent lines.

20. The template of claim 19, wherein the second translucent marking is of a second color that is different than the first color and the third translucent line is of a color that is darker in color than the first and second colors.

21. The template of claim 19 wherein the first translucent marking comprises a marking formed of fluorescent pigment material.

22. The template of claim 19 wherein the first translucent marking has a yellow color and the second translucent marking has a frosted white color.

* * * * *